(12) United States Patent
Pendar

(10) Patent No.: US 8,515,956 B2
(45) Date of Patent: Aug. 20, 2013

(54) METHOD AND SYSTEM FOR CLUSTERING DATASETS

(75) Inventor: Nick Pendar, Walnut Creek, CA (US)

(73) Assignee: H5, San Francisco, CA (US)

( * ) Notice: Subject to any disclaimer, the term of this patent is extended or adjusted under 35 U.S.C. 154(b) by 177 days.

(21) Appl. No.: 12/773,335

(22) Filed: May 4, 2010

(65) Prior Publication Data

US 2010/0287160 A1 Nov. 11, 2010

Related U.S. Application Data

(60) Provisional application No. 61/177,087, filed on May 11, 2009.

(51) Int. Cl.
*G06F 17/30* (2006.01)

(52) U.S. Cl.
USPC .......................................................... 707/737

(58) Field of Classification Search
USPC .......................................... 707/737, 747, 754
See application file for complete search history.

(56) References Cited

U.S. PATENT DOCUMENTS

| | | | | |
|---|---|---|---|---|
| 7,574,409 B2 * | 8/2009 | Patinkin | | 706/12 |
| 7,761,466 B1 * | 7/2010 | Eshghi | | 707/772 |
| 2008/0247659 A1 * | 10/2008 | Ramirez et al. | | 382/252 |
| 2010/0017487 A1 * | 1/2010 | Patinkin | | 709/206 |
| 2011/0173189 A1 * | 7/2011 | Singh et al. | | 707/722 |

\* cited by examiner

*Primary Examiner* — Khanh Pham

(74) *Attorney, Agent, or Firm* — Lowenstein Sandler LLP

(57) ABSTRACT

A method and system for clustering a plurality of data elements is provided. According to embodiments of the present invention, a bit vector is generated based on each of the data elements. Bit operations are used to group each data element into a cluster. Clustering may be performed by partition clustering or hierarchical clustering. Embodiments of the present invention cluster data elements such as text documents, audio files, video files, photos, or other data files.

20 Claims, 7 Drawing Sheets

| | 302 | 304 |
|---|---|---|
| million | 8113.9058113844203 | 1.08701048632165304 |
| percent | 7530.12401764402342 | 1.06182410730871881 |
| year | 7034.13838264651792 | 0.817700541632918593 |
| shar | 6647.87869305154448 | 1.38966397134923571 |
| trad | 5025.25506157864262 | 1.29049088905204757 |
| bank | 4908.32025103976825 | 1.55714314806348005 |
| company | 4637.62816193824528 | 1.28850030866662183 |
| market | 4582.29599531790234 | 1.20332740809529827 |
| net | 4134.01350856545341 | 1.95453861467142684 |
| stat | 3918.30829854260537 | 1.12780299003750748 |

METHOD AND SYSTEM FOR CLUSTERING DATASETS

CROSS-REFERENCE TO RELATED APPLICATION

This application claims the benefit of U.S. Provisional Patent Application No. 61/177,087, filed May 11, 2009, titled 'A Rapid Sketch-Based Clustering Algorithm for Large High-Dimensional Datasets,' which is herein incorporated by reference.

FIELD OF THE INVENTION

The present invention relates generally to a method and system for clustering data elements. More specifically, embodiments of the present invention relate to a method and system for analyzing a dataset comprising a plurality of data elements to facilitate grouping of each data element into a cluster.

BACKGROUND OF THE INVENTION

Data clustering refers to the act of creating relationships between like data elements. When clustering data elements, such as text documents, the subject matter of the documents may be the basis for grouping decisions. Creating a cluster of like documents is helpful in many data management scenarios, such as, for example, document production or data mining.

Data clustering is often performed on large high-dimensional datasets which require significant processing time to accurately cluster data elements. Within conventional data clustering systems, data elements are converted into numerical values that uniquely identify the data element.

According to a conventional data clustering system, such as k-Medoid Clustering, the data elements are grouped based on the relative distances between each numerical value. In such a clustering system, a plurality of medoids, or cluster points, are selected and each of the data elements is associated with the nearest medoid. A distance metric (such as cosine, Euclidean or Hamming distance) is used to determine the distance between a data element and each medoid. Conventional data clustering systems may optimize the data cluster by adjusting the location of the medoid to determine if an alternative location could create a more efficient data cluster. However, the process of calculating the distance between a data element's numerical value and relevant medoids requires significant processing resources and results in delays when clustering high-dimensional datasets. In particular, conventional data clustering systems experience delays when clustering high-dimensional datasets that include text documents, audio files, video files, or image files.

For example, a conventional data clustering system may be used to cluster text documents in support of a document production request within the discovery phase of litigation. Such a document production request could require the review of hundreds of thousands of documents. Clustering documents based on their subject matter could help identify groups of likely relevant documents. However, given the large of number documents at issue in many document production requests, conventional data clustering systems can not effectively cluster the documents and as a result, document clustering if often not utilized as a tool when responding to a document production request.

As a result, there is a need in the art for a method and system to more efficiently cluster high-dimensional data.

SUMMARY OF THE INVENTION

Embodiments of the present invention satisfy these needs and others by providing a method and system for performing data clustering of a high-dimensional dataset. According to certain embodiments of the present invention, the high-dimensional dataset may be comprised of a plurality of data elements. The data elements may include, but are not limited to, text documents, audio files, video files, photos, or other data files.

According to an embodiment of the present invention, a vector of reals is generated corresponding to each of the plurality of data elements. A vector of reals is a numerical representation of a data element in terms of the features contained therein. For example, a vector of reals corresponding to a text document represents one or more of the words within the document as a vector of numbers.

In addition to the vector of reals, a set of random vectors is generated. Together with the vectors of reals and the random vectors a bit vector is created corresponding to each data element to be clustered. The bit vector is a series of bits that together encode the approximate position of a data element. According to embodiments of the present invention, a bit vector is generated for each data element to allow for the use of bit operations when performing data clustering.

Following the creation of a bit vector corresponding to each data element, according to an embodiment of the present invention, each of the bit vectors is assigned to a cluster through the use of partition clustering technique or hierarchical clustering technique. Both forms of clustering create a group of bit masks wherein each bit mask corresponds to a cluster within which a bit vector could be assigned. Each data element is compared to one or more of the bit masks using bit operations and the data element is assigned to a given cluster based on the output of the bit operation. Given that minimal computation is required to perform simple bit operations, the plurality of bit vectors may be clustered with minimal computational effort.

An embodiment of the present invention provides for clustering a plurality of data elements, comprising the computer-implemented steps of generating a bit vector for each of the plurality of data elements based on a vector of reals associated with a data element from within the plurality of data elements and a plurality of random vectors, thereby generating a plurality of bit vectors, creating a histogram based on the plurality of bit vectors, partitioning the histogram into a plurality of regions, creating a bit mask for each of the plurality of regions, and clustering each of the plurality of documents into one of a plurality of clusters by comparing the bit vector for each of the plurality of documents with each of the bit masks.

BRIEF DESCRIPTION OF THE DRAWINGS

The present invention will be more readily understood from the detailed description of exemplary embodiments presented below considered in conjunction with the attached drawings, of which:

FIG. 3 illustrates a portion of an exemplary feature set, according to an embodiment of the present invention;

FIG. 4 illustrates an exemplary vector of reals representing a document, according to an embodiment of the present invention;

DETAILED DESCRIPTION OF THE DRAWINGS

Figure 1:
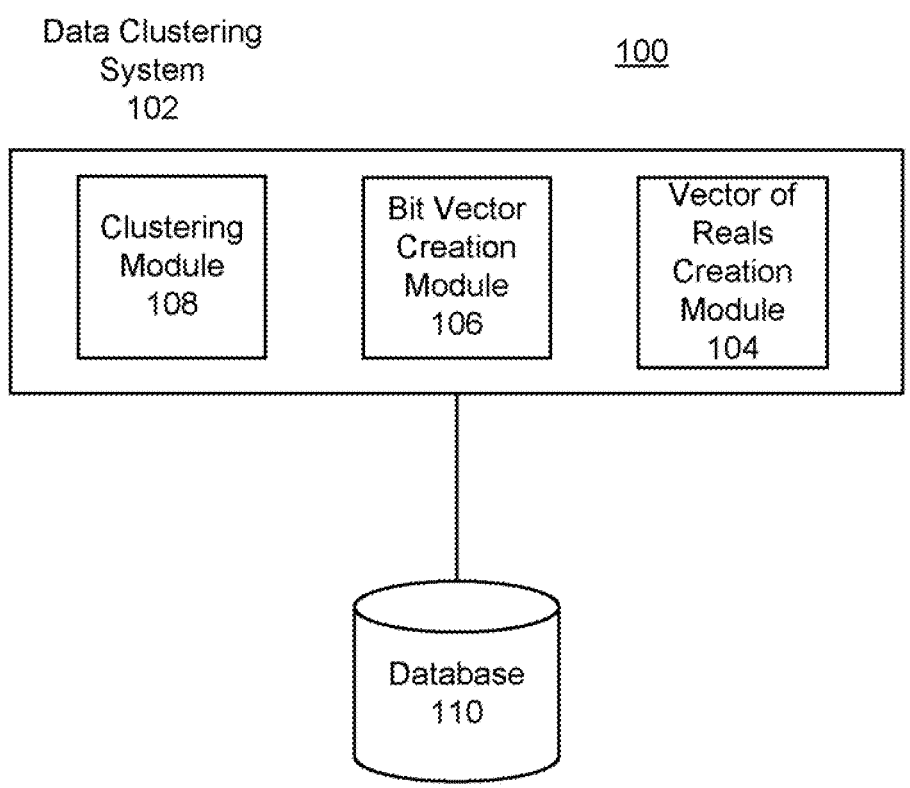
FIG. 1 illustrates an exemplary system for clustering a dataset, according to an embodiment of the present invention.

FIG. 1 illustrates a Data Network 100 according to an embodiment of the present invention. As illustrated in FIG. 1, the Data Network 100 includes a Dataset Clustering System 102 comprising, a Vector of Reals Creation Module 104, a Bit Vector Creation Module 106, and a Clustering Module 108, communicatively connected to a Database 110. As used herein, the term "module" is intended to include, but is not limited to, one or more computers configured to execute one or more software programs configured to perform one or more functions. The term "computer" is intended to include any data processing device, such as a desktop computer, a laptop computer, a mainframe computer, a personal digital assistant, a server, a handheld device, or any other device able to process data. The aforementioned components of the Data Network 100 and the Dataset Clustering System 102 represent computer hardware and/or computer-implemented software modules configured to perform the functions described in detail below. One having ordinary skill in the art will appreciate that the components of the Data Network 100 may be implemented on one or more communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers.

The features and functionality of embodiments of the Data Network 100 and its components are described in detail in connection with the system diagram of FIG. 1 and the process flow diagram of FIG. 2. As illustrated in FIG. 1, the Dataset Clustering System 102 is communicatively connected to the Database 110. The Database 110 may be configured to store a plurality of data elements, wherein a collection of data elements is referred to as a dataset. A "data element" may include, but is not limited to, any form of data that may be clustered into one or more group based features within each data element. A data element may be, for example, a document, image file, or audio file. In operation, the Dataset Clustering System 102 accesses the Database 110 to retrieve the dataset to be clustered, at step 202 of FIG. 2.

According to an embodiment of the present invention, the Vector of Reals Creation Module 104 may retrieve a dataset from the Database 110, at step 202. The Vector of Reals Creation Module 104 is configured to create a vector of reals for each data element within the data set. The term "vector of reals" is intended to include, but is not limited to, a mathematical object representing a data element in a high dimensional vector space over the real numbers. Embodiments of the present invention use a vector of reals to encode a data element as a numeric object, allowing for mathematical manipulation of the underlying data element. Therefore, the vector of reals is a numerical representation of a data element in terms of the features contained therein. When creating a vector of reals for a data element which is a document, embodiments of the present invention, identify features (e.g., words) within a given document and code the document to create a numerical representation of the words and the frequency with which the words appear within the document.

The Vector of Reals Creation Module 104, illustrated in FIG. 1, extracts a feature set from the dataset, at step 204. A "feature set" is intended to include, but is not limited to, a list of some or all of the features contained in the dataset, along with a weight assigned to each of the listed feature. According to embodiment of the present invention, if the dataset includes text documents, the features used in the analysis may be the words set forth in the document. The number of feature (e.g., words) included in a feature set is referred to herein as the "dimensionality." Each feature within the feature set may be a word or a stemmed word, wherein a stemmed word is a root word or collection of characters upon which other words are built. The Vector of Reals Creation Module 104 may be configured to identify words based on a stemmed word to ensure that related words are treated as a single word. For example, the feature set may include the word "bank" and associated therewith instances of the words "bank," "banks," "banking," and "banker." As a result, the weight associated with the word "bank" reflects the occurrence of the related words "bank," "banks," "banking," and "banker" that appear in a dataset.

FIG. 3 illustrates a portion of an exemplary feature set representing Feature Set 300, a document, wherein the first ten words in Feature Set 300 are shown. As illustrated in FIG. 3, each word within the Feature Set 300 has a Measure of Significance 302 and a Weight 304. Feature Set 300 includes, for example, stemmed words, such as "shar," which may, when calculating the Weight 304, include instances of the words "share," "shares," and "shareholder." As a result, when calculating the number of times the word "shar" occurs in the dataset, the presence of the words "share," "shares," and "shareholder" will each be included in the word frequency calculation. According to an embodiment of the present invention, the Measure of Significance 302 is calculated as the sum of the normalized frequency of a word in the entire dataset. The normalized frequency of a word is calculated as the number of occurrences of the word in a document divided by the total number of words in the document. Calculating a Measure of Significance 302 allows for the selection as features a subset of the words that appear in the dataset for the sake of efficiency. The Weight 304 contains weights associated with each feature. When data to be clustered are textual, the Weight 304 may be calculated as Inverse Document Frequency $\text{idf}_i = \log(|D|/|\{d: t_i \in d\}|)$, where D represents the dataset, $t_i$ represents the word i and d represents a single document. Inverse Document Frequency is a measure of the spread of a word across different documents. As a result, a word that appears with a higher frequency in more documents within a dataset may be assigned a greater Weight 304 than a word that appears in fewer documents.

As noted above, the number of features included in a feature set is referred to as the dimensionality of the data. For example, a feature set may include only the five thousand most used words within a dataset. Limiting the number of features (i.e., reducing the dimensionality) in a feature set may reduce processing time, however, a high dimensionality may provide great granularity when clustering the dataset. According to an embodiment of the present invention where the Measure of Significance 302 is calculated as normalized term frequencies, the top n most frequent words are selected as features, where n may range from 1,000 to 20,000.

A vector of reals may be generated to represent many types of data elements including, but not limited to, text, audio, video, photographs, line art, paintings, high-energy particle tracks, global positioning systems data, and topographical data. The data elements may be segmented into individual data points, representing the items to be clustered. According to an embodiment of the present invention, the data elements may be a natural consequence of the data population or of the desired application of clustering. For image data, for example, it is natural to treat each individual image as a separate data element. Each feature set is used along with the data element to generate a real number. In the case of image data, the feature set may be developed to correspond to the intensity of different parts of an image, or to particular colors in the image. In general, many different feature set configurations are possible for a given type of data type, such as, for example, text (e.g., features corresponding to individual words in the documents), audio (e.g., features corresponding to the amplitude of the signal at various frequencies and times), video (e.g., features corresponding to the presence or absence of certain colors in individual video frames, treatment of an entire video as a single data point, treatment of each video frame as a separate image data point and clustering over frames), photos (e.g., features corresponding to the presence or absence of certain colors in the image), line art (e.g., features corresponding to particular shapes in the image, such as, circles, lines, polygons), a painting (e.g., features corresponding to the presence or absence of human forms in the painting), high-energy particle tracks (e.g., features corresponding to the length and degree of curvature of the track), GPS (e.g., features corresponding to the longitude and latitude of a location), and topographic data (e.g., features corresponding to the altitude of a location).

Figure 2:
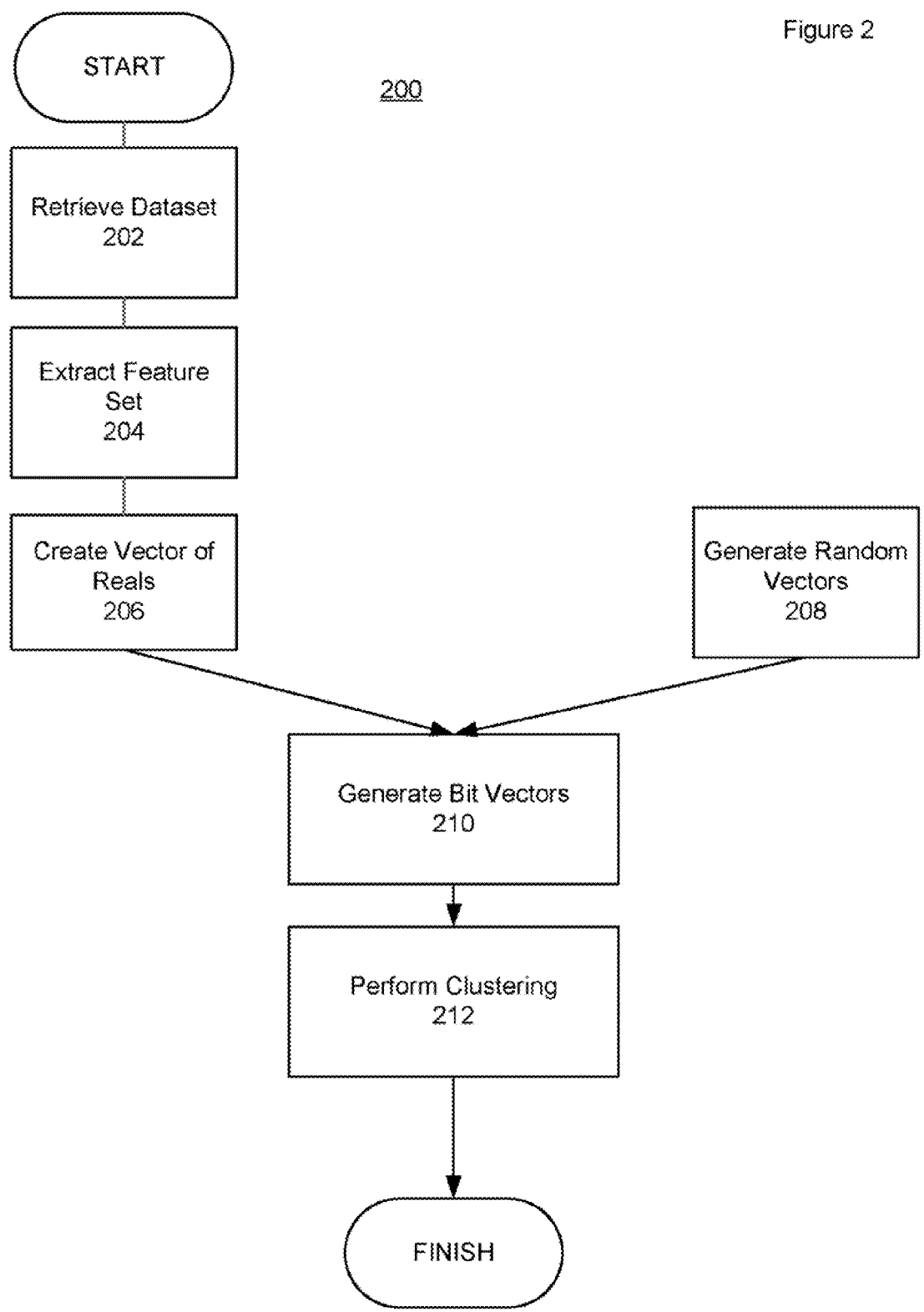
FIG. 2 illustrates an exemplary method for facilitating dataset clustering, according to an embodiment of the present invention.

Following the creation of a feature set for a given dataset, process 200 shown in FIG. 2 continues at step 206 by creating a vector of reals for each data element based on the feature set. Each vector of reals represents the frequency with which each feature appears in a corresponding data element.

Figure 4:
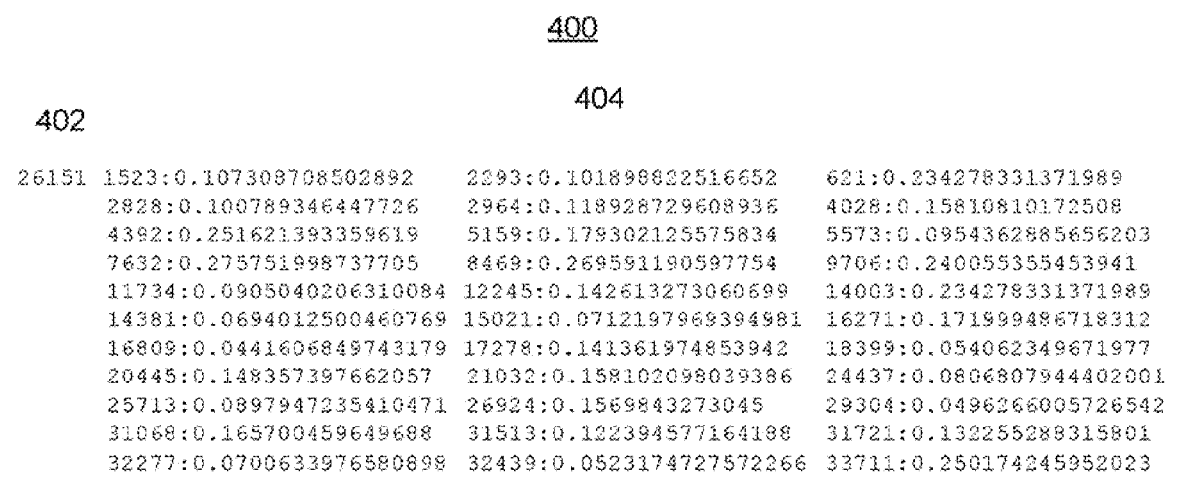

FIG. 4 illustrates a portion of a vector of reals for a given document. In FIG. 4, an Identification Number 402 uniquely identifies the vector of reals. The Feature Values 404 represent encoded features of the vector of reals as a sparse vector. Given that in some high-dimensional datasets most features are absent from a data point, the value for most features are zero. This is known as a sparse vector. Sparse vector may be represented in a space efficient way by only specifying non-zero values. The Index Values 404 comprise a set of Index/Value pairs. The Index is feature number; the Value is a non-zero measurement of the feature within the data element. For textual data, this value may be the tf.idf of the word. According to an embodiment of the present invention, the tf.idf of a word i is defined as tf.idf$_i$=(1+log(tf$_i$))×idf$_i$, where tf$_i$ is the term frequency of the word (i.e., the number of occurrences of the word in the document). Therefore, the pair 1523:0.107308708502892 in Index Values 404 means that feature number 1523 had the tf.idf of 0.107308708502892 in its corresponding data element.

Process 200 continues at step 208 by generating a plurality of random vectors. The random vectors are coupled with the vector of reals generated at step 206, to create a bit vector for each document. Random vectors are used as a form of dimensionality reduction, that is, a means of reducing the size of a data element. Embodiments of the present invention utilize large vectors of reals to represent a given data element. However, clustering a plurality of vectors of reals would be prohibitively computationally expensive. A significant reason for this expense is the high dimensionality of the vector of reals. By introducing random vectors, embodiments of the present invention may reduce the vector of reals to a more manageable size, such as 256, 512 or 1024 bits. Such a dimensionality reduction approach preserves the important characteristics of the original data while reducing the size to one that is more computationally manageable and desirable.

With reference to FIG. 1, the Bit Vector Creation Module 106 receives two inputs when generating the random vectors; the dimensionality of the feature set created for the current dataset; and the number of random vectors to be generated. As described above, the dimensionality represents the number of features within a feature set. The dimensionality selected when generating the vector of reals is the same as the dimensionality used to create the random vectors.

In addition to the dimensionality, the number of random vectors to be generated is selected. The number of random vectors generated determines the size of the bit vector corresponding to the document, therefore a smaller number of random vectors results in a smaller bit vector. As a result, according to certain embodiments, wherein computational speed is of primary concern, creating fewer random vectors advantageously produces a smaller bit vector and results in faster clustering. However, a smaller bit vector may degrade the quality of a clustering result, therefore both performance speed and clustering quality are factors to be considered when selecting the number of random vectors to generate.

According to certain embodiments of the present invention, the random vectors are created by randomly generating floating point numbers. The dimensionality, d, dictates the number of floating point numbers created for a given random vector. For each random vector, d random double floating point numbers are generated within a given range. The d random double floating point numbers are grouped into a dimensional vector which is normalized to a magnitude of 1.0, thereby creating a unit-length random vector. This process is repeated to generate each random vector. According to certain embodiments of the present invention, one having ordinary skill in the art will appreciate that the one or more random vectors may be created using other suitable methods, such as, for example, by generating one random value between 0 and 1 for the first dimension and then constraining the value of the second dimension to the range from 0 to 1 minus the value of the first dimension, and then constraining the value of the third dimension to the range from 0 to 1 minus the sum of the previous two values, and so on. This will also ensure that the random vector is unit length and the distribution of the values is uniform. The random vectors are then sorted according to their distance from a reference point, such as a base vector, all of whose values are 0 except one which is set to 1, or an extra random vector. This sorting imposes a rough ordering on the random vectors.

Together with the vector of reals and the random vectors, a bit vector or signature, for each data element is created at step 210. The Bit Vector Creation Module is configured to create a signature or bit vector for each of the data elements included in the dataset. A "signature" is intended to include, but is not limited to, a bit vector representing a single data element. For example, a 256-bit bit vector may be created based on a document included in a dataset. The bit vector may be created through the use of any suitable technique known in the art, such as, for example, locality sensitive hashing techniques. This technique allows for the representation of a data element as a bit vector thereby allowing clustering of data elements through the use of bit operations.

A bit vector may be computed using a random hyperplane hash function, which creates for each data element an n-dimensional bit vector, where each bit position, i, is set to 1 or 0 according to whether the dot product of the vector of reals and the ith random vector is greater or less than zero. The result is a set of n-dimensional bit vectors, one for each document in the data set.

Following the creation of a bit vector for each document within the dataset, the bit vectors are transmitted to the Clustering Module 108 to perform data clustering, at step 212 of process 200. When clustering the bit vectors, the Clustering Module 108 groups each of the bit vectors into a cluster by performing bit operations on the bit vector. According to certain embodiments of the present invention, the Clustering Module 108 may cluster the dataset through the use of partition clustering or hierarchical clustering. The steps performed to cluster the bit vectors through the use of partition clustering and hierarchical clustering are described in detail below in reference to FIGS. 5 and 6, respectively. In general, the processes of both partition clustering and hierarchical clustering create bit masks corresponding to the clusters within which bit vectors may be grouped. To perform such grouping, the bit mask and bit vectors are compared using the AND bit operation to determine which cluster each bit vector should be grouped.

Figure 5:
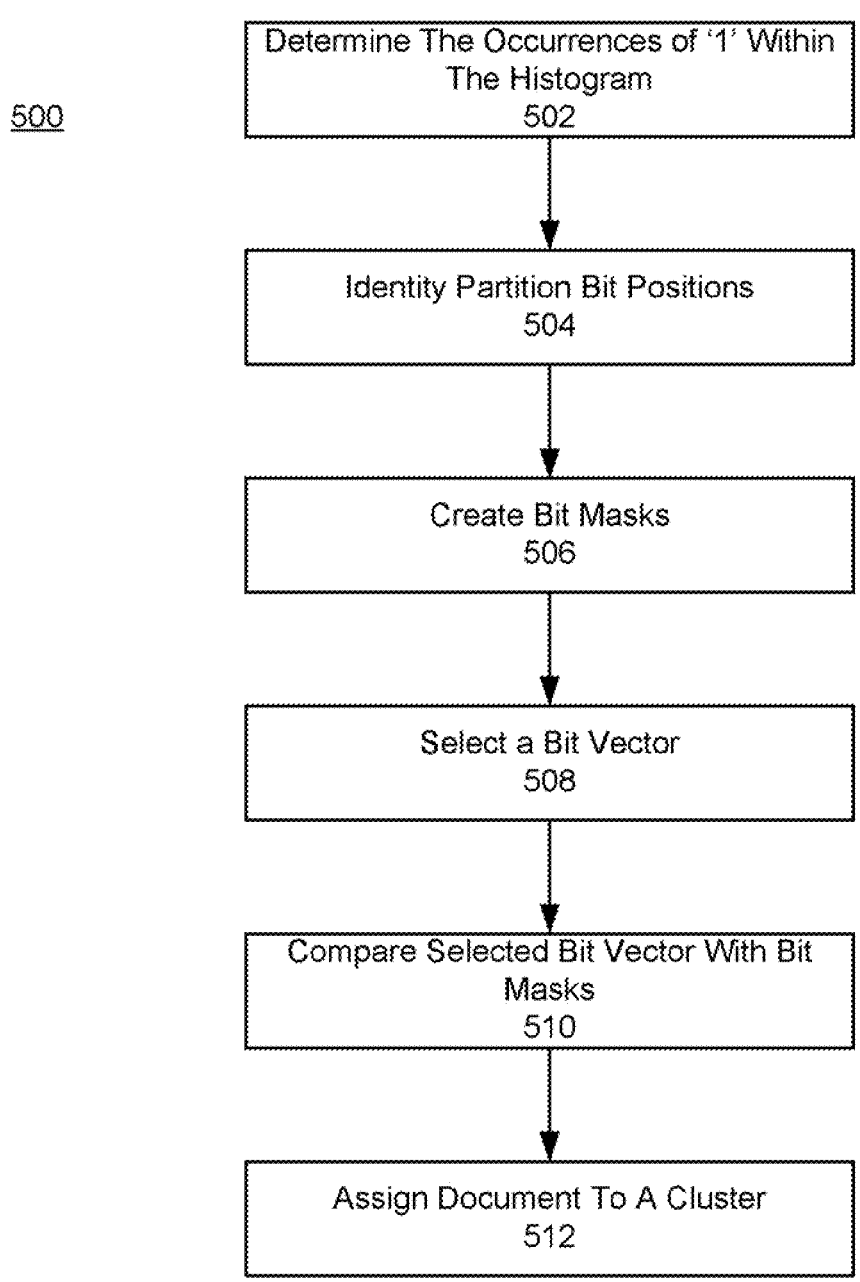
FIG. 5 illustrates an exemplary method for performing partition clustering, according to an embodiment of the present invention.

FIG. 5 illustrates a partition clustering process according to an embodiment of the present invention. When implementing the partition clustering process, the number of desired clusters is selected prior to beginning the clustering process. This number may be the number of categories one expects to find in the data set. The partition clustering process begins at step 502 by determining the number of occurrences of "1" at each bit position within the collection of bit vectors. To account for the occurrences of a "1", a hash value distribution graph, or histogram, is created based on all of the bit vectors. The histogram provides a representation of each bit position and the number of times a "1" is present across all bit vectors for each bit position. The histogram allows for an accurate count of the number of occurrences of a "1" in each bit position within the collection of bit vectors. The valleys in the histogram help to identify locations in the n-dimensional Hamming space where data are sparse. These locations are then assumed to be cluster boundaries.

Following the creation of the histogram, method 500 continues at step 504 by identifying partition bit positions within the histogram. A partition bit position signifies a location within the histogram used to split the histogram into a plurality of portions for use when creating a plurality of bit masks. The number of partition bit positions is one less than the desired number of clusters. As a result, if the desired number of clusters is four, the Clustering Module 108 will identify three partition bit positions.

Identifying the partition bit positions is achieved by performing a form of binary searching to locate the deepest valleys in the histogram. Given a histogram or hash value distribution graph, g, and a desired number of clusters, k, the deepest valley analysis may be performed by first creating a queue data structure which contains left-position and right-position pairs and initializing the queue data structure with the pair <0, s>, where s is the bit vector size. Following the initialization of the queue data structure, the next useful pair, <l, r>, l<r, is removed from the queue data structure to determine the midpoint, h between l and r. Having determined the midpoint b for the given pair, the nearest valley to the left of b is identified, (i.e., the point to the left of b where the value of the histogram is lower than that at b and also lower than the next histogram value further left). In addition, the nearest valley to the right of b is similarly identified. The identified nearest valleys to the left of b and to the right of b are compared to determine which of the valleys is deeper. The deeper of the two valleys is identified as v and output as one of the identified valleys. The queue data structure is updated by adding the pairs <l, v> and <v+1, r> to the queue data structure. This process of identifying the nearest valley is repeated until the desired number of clusters is generated. The partition point positions are assigned to the locations of the identified valleys Through the use of the identified partition bit positions, the Clustering Module 108 creates a plurality of bit masks, at step 506. Each bit mask is represented by a series of bits equal to the length of the bit vector Within each bit mask, all of the bits are set to "0" except for a delineated number of bits identified by the partition bit positions wherein all of the bits are set to "1". For example, assume that a bit vector has a length of 256 bits and the desired number of clusters is four. Further assume that the partition bit positions are at bits 64, 128, and 192. In such an example, four bit masks will be created, one corresponding to each of the desired clusters, wherein the bit masks appear as follows:

| | Partition Clustering Bit Masks | | | |
|---|---|---|---|---|
| | 64 bits | 64 bits | 64 bits | 64 bits |
| m1: | 11111 ... 11111 | 00000 ... 00000 | 00000 ... 00000 | 00000 ... 00000 |
| m2: | 00000 ... 00000 | 11111 ... 11111 | 00000 ... 00000 | 00000 ... 00000 |
| m3: | 00000 ... 00000 | 00000 ... 00000 | 11111 ... 11111 | 00000 ... 00000 |
| m4: | 00000 ... 00000 | 00000 ... 00000 | 00000 ... 00000 | 11111 ... 11111 |

As illustrated above, each bit mask includes a series of bits set to "1" at bit locations defined by the partition bit positions. Each bit mask corresponds to a cluster and is used by the Clustering Module 108 to assign each bit vector to a given cluster.

According to the embodiment of the present invention described in FIG. 5, method 500 continues by selecting a bit vector from the plurality of bit vectors and comparing the bit vector to the bit mask, at step 508. To assign the bit vector to a given cluster, bit vector and each bit mask is processed using the AND bit operation. The result from each bit operation is compared to determine which bit operation produced the greatest number of 1s, at step 510. A step 512, the document associated with a given bit vector is assigned to the cluster corresponding to the bit mask that produces the greatest number of 1s. The process of comparing a bit vector to each of the bit masks and assigning a document to a cluster based on the comparison, steps 508-512, may be repeated until each document has been assigned to a cluster. The process of partition clustering is completed once all documents have been assigned to a cluster. In an alternative embodiment of the present invention when less than all of the documents within a dataset are clustered, partition clustering is complete once a given percentage or number of documents have been grouped.

According to certain embodiments of the present invention, when comparing a bit vector to each of the bit masks, two or more bit masks may produce an equal number of 1s, which is also the greatest number of 1s. In such an embodiment, the document associated with the given bit vector may be assigned to any of the clusters corresponding to any of the two or more bit masks that produced the equal number of 1s.

Figure 6:
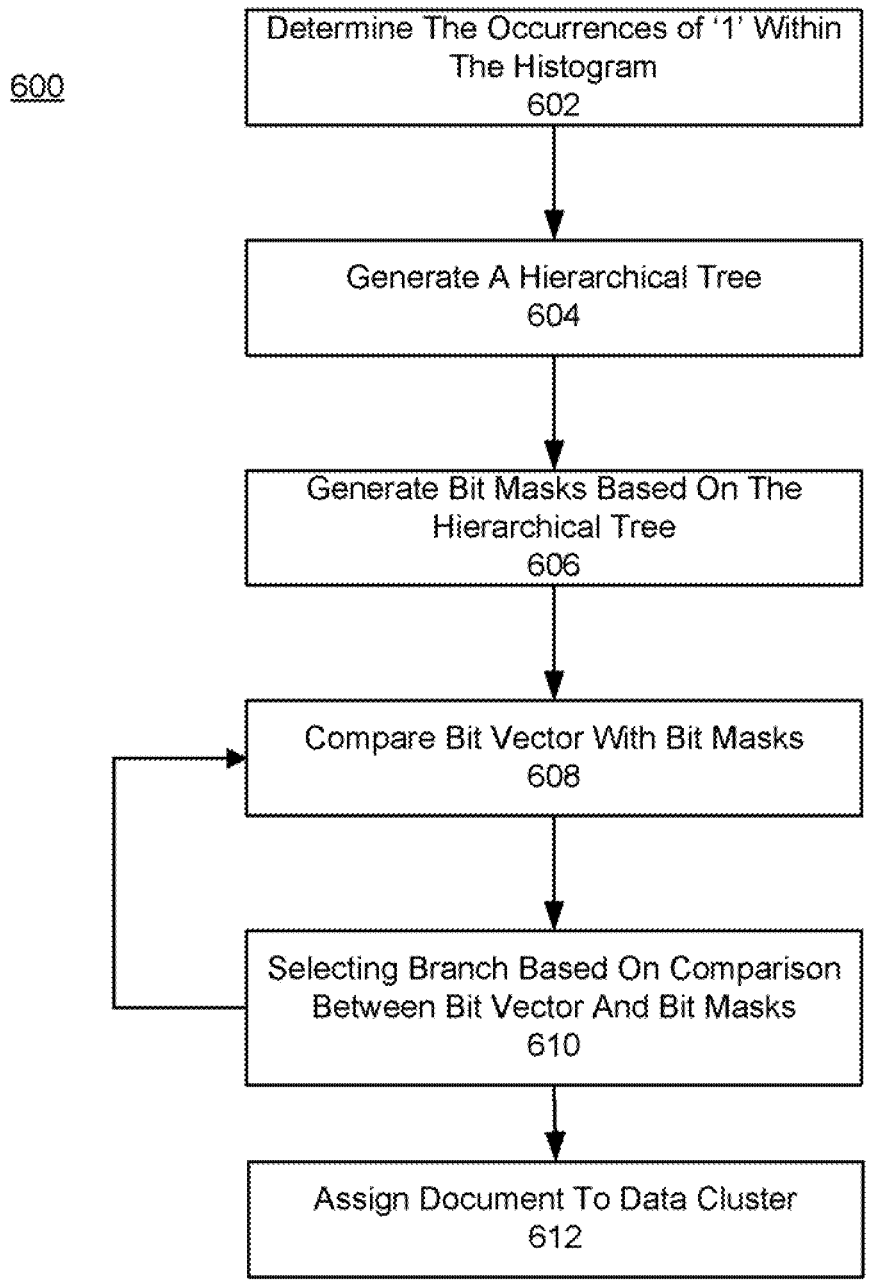
FIG. 6 illustrates an exemplary method for performing hierarchical clustering, according to an embodiment of the present invention.

According to alternative embodiments of the present invention, the clustering step 212 of process 200 may be performed by hierarchical clustering, as illustrated in FIG. 6. Unlike partition clustering, hierarchical clustering may not rely on an explicitly desired number of clusters, but instead creates a hierarchical tree which determines the number of possible clusters. The hierarchical tree may be created by iteratively dividing the histogram.

As with partition clustering, hierarchical clustering begins, at step 602 by generating a histogram of the occurrences of 1s at each bit position within the bit vectors. Following the creating of the histogram, process 600 continues by generating a hierarchical tree, at step 604. To create the hierarchical tree, the valleys within the histogram are first identified by performing binary searching, as described above. Based on the location of the identified valleys within the histogram, the hierarchical tree is created by first dividing the bit vector positions into two of the deepest valleys within the histogram, resulting in two nodes or branches. Each of these two nodes is then divided into two additional regions based on the deepest valley found within each node. This iterative process of splitting each node in two continues until the hierarchical tree has reached a desired size or has achieved specific criteria.

According to embodiments of the present invention, various criteria may be applied to determine when to terminate the iterative hierarchical tree creation process, including, for example, when the desired number of clusters are generated, when the number of items in the generated clusters fall below a certain threshold, when the number of items in the generated clusters are approximately equal, and when the radius of the generated cluster falls below a certain threshold.

Figure 7:
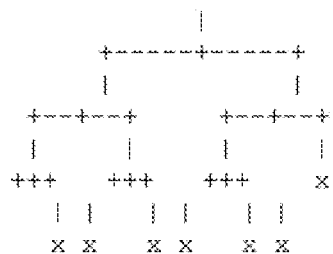
FIG. 7 illustrates a series of hierarchical trees, according to an embodiment of the present invention.
Figure 7:
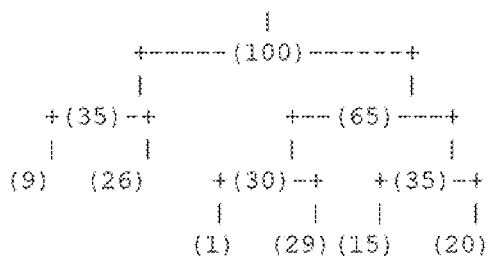
Figure 7:
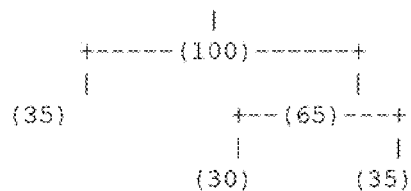
Figure 7:
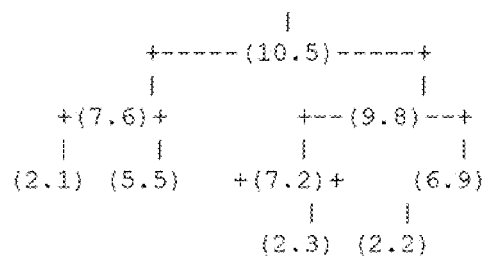

When generating a desired number of clusters, embodiments of the present invention execute the hierarchical clustering algorithm by splitting nodes in a breadth-first manner until the number of leaf nodes is equal to the desired number of clusters. Each splitting operation increases the number of leaf nodes by one, so that a particular value of clusters is guaranteed. As shown in FIG. 7, item 700 illustrates a hierarchical clustering wherein the number of desired clusters is seven.

When generating a hierarchical tree according to a minimal threshold, embodiments of the present invention execute the hierarchical clustering algorithm by splitting each branch within a hierarchical tree until the number of data elements in each leaf cluster is smaller than the threshold. For example, item 702 in FIG. 7 illustrates a hierarchical tree with a threshold of 30, wherein the number of data elements are shown in parentheses at each node. In this method, splitting the bit field and cluster assignment are performed simultaneously; that is, once two new bit masks are generated by splitting a larger bit mask at a valley, all data elements in the larger cluster are assigned to either of the two new clusters. Each new cluster is then further split in two if the number of data items in that cluster is larger than the specified threshold.

When generating a hierarchical tree to create approximately sized clusters, embodiments of the present invention execute the hierarchical clustering algorithm by splitting each branch within a hierarchical tree until each branch contains approximately the same number of data elements, as illustrated in FIG. 7 item 704. As show in FIG. 7 item 704, 100 data elements are initially split into two nodes, containing 35 and 65 data elements respectively. The larger, 65 data element node, is then split further, into 30 and 35 data element nodes. These nodes (containing 35, 30, and 35 data elements, respectively) are now approximately equal. If closer agreement between the 30 and 35 document nodes is desired, additional splitting may occur.

When generating a hierarchical tree to be within a given radius threshold, embodiments of the present invention compute for each node a radius function, which measures the degree of dispersion of the documents in the node, typically defined as the maximum distance of any document in the cluster from the centroid (average) of the cluster, wherein distance is computed as vector distance, usually between bit vectors. Item 706 shown in FIG. 7 illustrates a hierarchical tree wherein the radius threshold is 7.0.

With the hierarchical tree created, process 600 continues by generating a bit mask for each branch within the hierarchical tree, at step 606. Similar to the bit masks created above for use in partition clustering, the bit masks generated based on the hierarchical tree consists of a bit vector for each branch wherein all of the bits are set to "0" except for a delineated portion of the bit mask corresponding to a given branch, wherein all of the bits are set to "1". For example, assume an exemplary embodiment of the present invention utilizing a bit vector with a length of 256 bits and a hierarchical tree consisting of two primary branches each having two sub-branches. Further assume that the primary branch is split at bit position 128, and the sub-branches are split at bit positions 64 and 192. In such an example, six bit masks are created wherein the bit masks appear as follows:

| | Hierarchical Clustering Bit Masks | | | |
| --- | --- | --- | --- | --- |
| | 64 bits | 64 bits | 64 bits | 64 bits |
| m1: | 11111...11111 | 11111...11111 | 00000...00000 | 00000...00000 |
| m1.1: | 11111...11111 | 00000...00000 | 00000...00000 | 00000...00000 |
| m1.2: | 00000...00000 | 11111...11111 | 00000...00000 | 00000...00000 |
| m2: | 00000...00000 | 00000...00000 | 11111...11111 | 11111...11111 |
| m2.1: | 00000...00000 | 00000...00000 | 11111...11111 | 00000...00000 |
| m2.2: | 00000...00000 | 00000...00000 | 00000...00000 | 11111...11111 |

As illustrated above, six bit masks are generated based on the hierarchical tree consisting of two primary branches each having two sub-branches. The bit masks identified as m1 and m2 correspond to the two primary branches, while the bits mask m1.1 and bit mask m1.2 correspond to one group of sub-branches and bit mask m2.1 and bit mask m2.2 correspond to the other group of sub-branches. In alternative embodiments of the present invention, each sub-branch may be divided into one or more additional layers of sub-branches.

Following the creation of the bit masks based on the hierarchical tree, process 600 continues at step 608, by comparing a bit vector from within the plurality of bit vectors with the top level bit masks, at step 608. The bit vector and the top level bit masks are compared using the AND bit operation. The process 600 continues, at step 610, by selecting the branch from within the top level of the hierarchical tree which generates the greatest number of 1s as a result of the bit operation.

The hierarchical clustering continues by selecting the bit masks corresponding to the sub-branches below the selected primary branch and comparing the bit vector with the sub-branch bit masks, at step 610. If the current sub-branch level is the final tier within the hierarchical tree, the document associated with the bit vector is assigned to the cluster corresponding to the sub-branch bit mask that produced the greatest number of 1s, at step 612. Alternatively, if additional levels of sub-branches remain, steps 608 and 610 are repeated until the final level within the hierarchical tree is reached. The process of comparing a bit vector with bit masks corresponding to the branches within the hierarchical tree and assigning a document to a cluster based on the comparison, steps 608-612, is repeated until each document has been assigned to a cluster. The process of hierarchical clustering is completed once all documents have been assigned to a cluster. In an alternative embodiment of the present invention when less that all of the documents within a dataset are clustered, clustering is completed once a given percentage or number of documents have been grouped.

By way of example, assume the above-provided hierarchical tree of bit masks is to be used to classify a group of bit vectors. A bit vector from within the group of bit vectors is first be processed by performing an AND bit operation based on bit mask m1 and bit mask m2. If the AND bit operation between the bit vector and bit mask m1 produces more 1s than the AND bit operation between the bit vector and bit mask m2, the process focuses on the m1 branch of the hierarchical tree. The process continues by performing an AND bit operation on the bit vector and bit mask m1.1 and bit mask m1.2. Given that the above-provided hierarchical tree only has one sub-branch level, the document associated with the bit vector is assigned to the cluster corresponding to the sub-branch bit mask m1.1 or bit mask m1.2 that produces the greatest number of 1s. In an alternative embodiment of the present invention wherein addition sub-branch levels exist, the process continues until the final level is reached.

One of ordinary skill in the art will appreciate that the partition clustering method and the hierarchical clustering method perform clustering through the use of different methodologies but both may be used to perform the clustering step 212 of process 200.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for clustering a plurality of data elements, the method comprising:
    generating, by a computer, a bit vector for each of the plurality of data elements based on vector of reals associated with a data element of the plurality of data elements and a plurality of random vectors, thereby generating a plurality of bit vectors;
    creating, by the computer, a histogram based on the plurality of bit vectors;
    partitioning, by the computer, the histogram into a plurality of regions;
    creating, by the computer, a bit mask for each of the plurality of regions; and
    clustering, by the computer, each of the plurality of data elements into one of a plurality of clusters by comparing the bit vector for each of the plurality of data elements with each of the bit masks, wherein the comparing comprises processing the bit vector and each of the bit masks using a bit operation and assigning each of the plurality of data elements associated with the bit vector to the cluster with the corresponding bit mask generating greatest number of ones in the bit operation.

2. The computer-implemented method of claim 1, wherein generating the vector of reals comprises:
    extracting, by the computer, a feature set from the plurality of data elements, and
    generating, by the computer, a vector of reals for each the plurality of data elements based on the feature set.

3. The computer-implemented method of claim 1, wherein partitioning the histogram comprises identifying at least one deepest valley within the histogram.

4. The computer-implemented method of claim 3 wherein the identifying at least one deepest valley within the histogram comprises:
    creating a queue data structure having as entries pairs representing left-position and right-position;
    determining a mid-point between the left-position and the right-position of the entries pairs; and
    comparing depth of the valley identified nearest to left of the mid-point to the depth of the valley nearest to right of the mid-point.

5. The computer-implemented method of claim 3 wherein the identifying at least one deepest valley within the histogram is repeated until a specific number of clusters are generated.

6. The computer-implemented method of claim 1, wherein the plurality of data elements comprises one of image files, audio files or text files.

7. The computer-implemented method of claim 1 wherein the generating a bit vector for each of the plurality of vectors comprises executing a dot product operation between the vectors of reals and the plurality of random vectors.

8. A computer-implemented method for clustering a plurality of data elements, the method comprising:
    generating, by a computer, a bit vector for each of the plurality of data elements based on vector of reals associated with a data element of the plurality of data elements and a plurality of random vectors, thereby generating a plurality of bit vectors;
    creating, by the computer, a histogram based on the plurality of bit vectors;
    creating, by the computer, a hierarchical set of bit masks according to the histogram; and
    clustering, by the computer, each of the plurality of data elements into one of a plurality of clusters by comparing the bit vector for each of the plurality of data elements with the hierarchical set of bit masks, wherein the comparing comprises processing the bit vector and each of the bit masks using a bit operation and assigning each of the plurality of data elements associated with the bit vector to the cluster with the corresponding bit mask generating greatest number of ones in the bit operation.

9. The computer-implemented method of claim 8, wherein generating a vector of reals comprises:
    extracting, by the computer, a feature set from the plurality of data elements, and
    generating, by the computer, a vector of reals for each the plurality of data elements based on the feature set.

10. The computer-implemented method of claim 8, wherein the plurality of data elements comprises one of image files, audio files or text files.

11. The computer-implemented method of claim 8 wherein the generating a bit vector for each of the plurality of vectors comprises executing a dot product operation between the vectors of reals and the plurality of random vectors.

12. A system for clustering a plurality of data elements, comprising:
 a data processing device;
 a database coupled to the data processing device;
 a bit vector creation module coupled to the data processing device and the database, the bit vector creation module configured to:
  generate a bit vector for each of the plurality of data elements based on vector of reals associated with a data element of the plurality of data elements and a plurality of random vectors, thereby generating a plurality of bit vectors;
  and
 a clustering module coupled to the data processing device and the database, the clustering module configured to:
  create a histogram based on the plurality of bit vectors,
  partition the histogram into a plurality of regions,
  create a bit mask for each of the plurality of regions, and
  cluster each of the plurality of data elements into one of a plurality of clusters by comparing the bit vector for each of the plurality of data elements with each of the bit masks, wherein the comparing comprises processing the bit vector and each of the bit masks using a bit operation and assigning each of the plurality of data elements associated with the bit vector to the cluster with the corresponding bit mask generating greatest number of ones in the bit operation.

13. The system of claim 12, wherein the bit vector creation module is further configured to:
 extract a feature set from the plurality of data elements, and
 generate a vector of reals for each the plurality of data elements based on the feature set.

14. The system of claim 12, wherein clustering module is configured to partition the histogram comprises identifying an at least one deepest valley within the histogram.

15. The system of claim 12, wherein the plurality of data elements comprises one of image files, audio files or text files.

16. The system of claim 12 wherein the generate a bit vector for each of the plurality of vectors comprises execute a dot product operation between the vectors of reals and the plurality of random vectors.

17. A system for clustering a plurality of data elements, comprising:
 a data processing device;
 a database coupled to the data processing device;
 a bit vector creation module coupled to the data processing device and the database, the bit vector creation module configured to:
  generate a bit vector for each of the plurality of data elements based on vector of reals associated with a data element of the plurality of data elements and a plurality of random vectors, thereby generating a plurality of bit vectors;
  and
 a clustering module coupled to the data processing device and the database, the clustering module configured to:
  create a histogram based on the plurality of bit vectors,
  create a hierarchical set of bit masks according to the histogram, and
  cluster each of the plurality of data elements into one of a plurality of clusters by comparing the bit vector for each of the plurality of data elements with the hierarchical set of bit masks, wherein the comparing comprises processing the bit vector and each of the bit masks using a bit operation and assigning each of the plurality of data elements associated with the bit vector to the cluster with the corresponding bit mask generating greatest number of ones in the bit operation.

18. The system of claim 17, wherein the bit vector creation module is further configured to:
 extract a feature set from the plurality of data elements, and
 generate a vector of reals for each the plurality of data elements based on the feature set.

19. The system of claim 17, wherein the plurality of data elements comprises one of image files, audio files or text files.

20. The system of claim 17 wherein the generate a bit vector for each of the plurality of vectors comprises execute a dot product operation between the vectors of reals and the plurality of random vectors.

* * * * *